(22.)

A. M. WHITE.

Improvement in Brushes.

No. 4,701. Reissued Jan. 2, 1872.

The American Brush Co
assignees of
A. M. White
Inventor

Witnesses.
J. H. Thumway
A. J. Tibbits

By Attys.
Wm. E. Earle

AM. PHOTO-LITHOGRAPHIC CO. N.Y. (OSBORNE'S PROCESS.)

UNITED STATES PATENT OFFICE.

ALBERT M. WHITE, OF PORT CHESTER, NEW YORK, ASSIGNOR, BY MESNE ASSIGNMENTS, TO THE AMERICAN BRUSH COMPANY, OF NEW HAVEN, CONNECTICUT.

IMPROVEMENT IN BRUSHES.

Specification forming part of Letters Patent No. 47,157, dated April 4, 1865; reissue No. 4,701, dated January 2, 1872.

*To all whom it may concern:*

Be it known that ALBERT M. WHITE, of Port Chester, in the county of Westchester and State of New York, did invent a new and useful Improvement in the Manufacture of Brushes; and we do hereby declare the following, when taken in connection with the accompanying drawing and the letters of reference marked thereon, to be a full, clear, and exact description of the same, and which said drawing constitutes part of this specification and represents, in—

Figure 1:
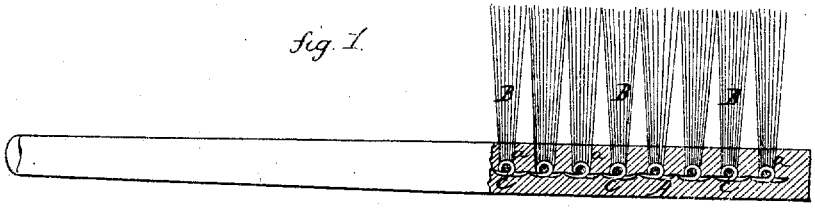
Figure 2:
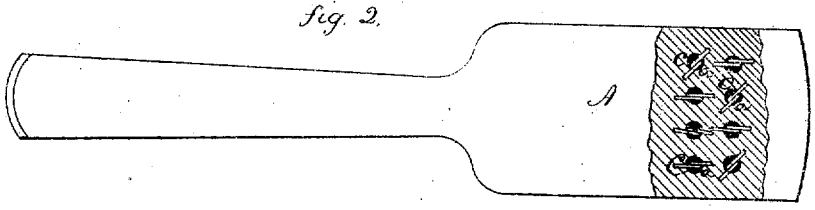
Figures 3, 4:
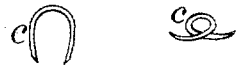

Figure 1, a longitudinal section of a brush made according to the said invention; Fig. 2, a back view of the same with a portion of the brush broken out to show the fastenings of the bristles; Fig. 3, a side view of one of the fastenings as formed previous to embracing the end of the tuft; and in Fig. 4, a side view of one of the fastenings in the form it assumes after being forced into the back.

This invention relates more particularly to brushes with wooden backs or stocks; its object being to secure the bristles in the back or stock, each tuft by an independent device, in contradistinction to securing the tufts by a device extending from the first tuft to every succeeding tuft, thus avoiding the loosening of all when one tuft is, by accident or otherwise, removed; and by this independent securing device the use of a false back (which is very liable to come off when the brush is wetted) and the labor of drilling holes longitudinally through the back or stock for the insertion of wires through loops formed by doubling the bristles is avoided; and the invention consists in a brush, the tufts of which are secured into the perforations in the brush-back by means of a device which embraces the doubled end of the tuft previous to its insertion in the back, each securing device being independent of the next or others.

A is a solid back or stock, of wood or other suitable material, into the face of which a sufficient number of holes, *a*, are drilled for the reception of the bushes or tufts of bristles B. The tufts B are doubled in the usual manner, and through the loops thus formed staple-like wires C are inserted to embrace the doubled end of the tuft, Each tuft is inserted into the holes, and forced down to the bottom thereof with a punch or other instrument, which, forcing the embracing device, causes it to spread into the wood or other material of which the back or stock is composed, and thus not only secure themselves in the back or stock, but clasp the loops of the bristles tightly, and each tuft secured independent of the other tuft, so that one tuft being removed has no tendency to loosen the others. To insure the most perfect fastening of the bristles by means of the clamp, shown in Fig. 3, the ends of the wire should be either beveled on the outer sides, as shown in Fig. 3, or turned slightly inward, which will cause them to cross each other, as shown in Fig. 4, when pressed against the bottom of the holes.

We claim as the invention of the said ALBERT M. WHITE—

A brush composed of several tufts, each tuft embraced at the doubled end by a device which, while holding together the filaments which compose the tuft, also serves to secure the said tuft in position, after insertion into the back, independent of the other tufts.

HENRY A. CARRINGTON,
*Secretary and Treasurer of*
*The American Brush Company.*

Witnesses:
A. J. TIBBITS,
J. H. SHUMWAY.

(22)